UNITED STATES PATENT OFFICE 2,573,862

PESTICIDAL COMPOSITION COMPRISING A ZINC SALT OF PETROLEUM SULPHONIC ACIDS

Arthur Minich, Westfield, and Milton Nowak, Union, N. J., assignors to Nuodex Products Co., Inc., Elizabeth, N. J., a corporation of New York No Drawing. Application July 16, 1949, Serial No. 105,265

1 Claim. (Cl. 167—30)

This invention deals with a very unusual and novel pesticidal agent.

Heretofore a great many formulations have been suggested and employed for the control of such diverse pests as fungi, bacteria, barnacles, insects and the like. These compositions have been employed over a wide range of useful articles of commerce and other matter, e. g., living plants, etc. Of particular interest to us has been the field of preservation of cellulosic materials against the degrading effects of fungi and bacteria in particular.

Prolonged experimentation and research have shown that the zinc salts of certain acids are unexpectedly effective in preventing mildew, rotting and bacterial vulnerability of cellulosic materials, such as wood, wooden articles, fabrics, rope, and the like. These acids are petroleum sulphonic acids having mean molecular weights in the range of 375–500. They are generally viscous liquids substantially non-volatile and substantially water-insoluble. They are mono basic and according to the best of present-day information have an alkyl aryl organic radical. In the form of their alkali earth soaps they are known as "mahogany" soaps. They differ somewhat in color and molecular weight and in their exact chemical composition. Whatever these variations may be, the acids within the range specified in this application (molecular weight 375–500) will provide commercially analogous results for our purposes.

The zinc salt of these acids, which primarily forms the subject-matter of this invention, represents a substantially non-volatile, substantially water-insoluble and oil-soluble compound which may be employed for a wide range of applications as pest control agent, especially for the protection of cellulosic materials against microbial attack, as well as against wood destructive insects.

The end product of this invention is not only highly effective against the pests referred to above, but it performs its protective function without imparting toxicity to the treated articles. This is of utmost commercial importance, particularly in connection with the preservative treatment of wooden items, such as wooden boxes and pallets, which may be in intimate contact with foodstuffs. The treatment with the end product of this invention, while according excellent protection against wood destructive mildew and decay and wood destructive insects, such as Lyctus Powder Post beetles and termites, will not create any health hazard in the articles thus protected.

Another desirable property of the end product of this invention is its lack of odor. Many pest control agents which might otherwise be suitable for the treatment of such useful articles of commerce as food containers, etc., cannot be employed because they impart an objectionable residual odor to the treated wood or to the food that may be packaged therein.

The end product of this invention, being oil-soluble, may be employed in the form of dilutions in water immiscible solvents, such as mineral spirits, toluol, xylol, etc. It is also practical for certain purposes to employ this product in the form of an emulsion as an aqueous system.

The zinc petroleum sulphonate of this invention may be employed by itself to satisfactorily protect cellulosic material as stated. However, it may also be employed in conjunction with other pest control agents.

It has been found useful for certain applications to employ the end product of this invention in conjunction with certain other compositions, such as varnishes, water repellents, etc. In this connection a combination of the pest control agent or agents together with a water repellent sealer for wood has been especially successful in the treatment of wooden boxes and similar articles.

Having thus generally described the present invention, we will now proceed with specific examples of practical performance.

*Example 1*

500 grams of mineral spirits are placed in a 2-liter beaker together with 702 grams of a commercial petroleum sulphonate ("Acto 600") containing 420 grams of active sodium soap of molecular weight 455. The mixture is heated to 180° F. and agitated until it is homogeneous. 64.4 grams of zinc chloride (47.1% zinc) are added as rapidly as foaming permits. The reaction mixture is then heated to 265° F. and maintained at this temperature until substantially all water present has been driven off. The reaction mixture is then filtered and analyzed for per cent zinc. The product is diluted with mineral spirits to a zinc content of 2.75% and consists of an amber liquid containing 50% solids. The yield is 95%.

The end product of this example was subjected to very thorough evaluation to determine its efficacy as a pest control agent. It was applied in various dilutions in volatile solvents to cellulosic materials, in particular, to wood. The various treated specimens, together with untreated controls, were then subjected to several test methods, including soil burial test, exposure to the wood destroying fungus Trichoderma, etc. It was found that while the untreated control specimen succumbed to these conditions, the various treated specimens showed remarkable resistance.

Example 2

A solution of 594 grams of a commercial petroleum sulphonate ("Sheroscope L-75") containing 440 grams of sodium sulphonate of molecular weight 434, in 300 grams of xylol is heated to 180° F. While agitating rapidly, a solution of 64.4 grams of zinc chloride (47.1% zinc) in 300 cc. of water are added. The temperature of the batch is then brought up to 250° F. as rapidly as foaming permits. When all the water is driven off, the batch is filtered and analyzed for per cent zinc. The solution is diluted with xylol, to obtain a 92% yield of an amber liquid containing 2.5% zinc.

The end product of this example was subjected to severe tests in order to establish its utility as a pesticidal agent. The product was diluted in various ratios with solvents, and these dilutions were then applied to wood and fabric. The treated articles, together with the untreated control specimen, were then subjected to a number of accelerated tests, including *Chaetomium globosum*, soil burial, etc. These tests proved that the end product of this example provided very high degree of immunity to these conditions for the treated specimens. In addition to these biological tests, there was also carried out a termite test, which established that the treated samples were rendered highly repellent to termite attack, whereas the untreated controls were readily attacked by the termites.

Example 3

500 grams of mineral spirits are placed in a 2-liter beaker together with 734 grams of a commercial petroleum sulphonate ("Petronate L") containing 455 grams of active sodium sulphonate of molecular weight 420. The mixture is heated to 180° F. and agitated until it is homogeneous. 64.4 grams of zinc chloride (47.1% zinc) are added as rapidly as foaming permits. The reaction mixture is then heated to 265° F. and maintained at this temperature until substantially all water present has been driven off. The reaction mixture is then filtered and analyzed for per cent zinc. The product is diluted with mineral spirits to a zinc content of 2.75% and consists of an amber liquid containing 50% solids. The yield is 91%.

The composition obtained, as described in this example, was thoroughly appraised for its value as a pest control agent. For this purpose, the composition was applied in various dilutions to a number of cellulosic materials, including plywood, fibreboard, rope, etc. The treated items, together with untreated control specimens, were then subjected to a variety of conditions which are known to destroy the unprotected cellulosic articles. For example, the rope was subjected to a sea water exposure. The plywood was subjected to wood destructive fungi in a test procedure known as the Leutritz method. The results of all of these rigorous tests established beyond question the high degree of efficiency of the composition as a pest control agent.

Example 4

The petroleum sulphonic acids derived by hydrolysis of 700 grams of a commercial petroleum sulphonate ("Petronate") containing 434 grams of sodium sulphonate of molecular weight 440, are dissolved in 300 grams mineral spirits. 37½ grams of zinc oxide are added, and the mixture agitated rapidly while heating to a temperature of 230° F. After one-half hour, the solution is filtered, analyzed for per cent zinc, and diluted with mineral spirits to yield an end product consisting of a dark amber liquid containing 2.5% zinc. The yield is 87%.

The performance of the end product of this example was investigated to determine its efficiency as a pest control agent. For this purpose, the treatment was applied to a number of materials which are vulnerable in the unprotected state to the attack of pests, in particular, fungi and bacteria. The various treated articles, together with untreated controls, were then inoculated with fungi and bacteria. The results of these tests proved that the treatment had rendered the articles remarkably immune, whereas the untreated controls had become heavily overgrown by the microbial contamination.

The average empirical formula of the petroleum sulphonic acids referred to in the foregoing examples is believed to be $C_nH_{2n-10}SO_3H$. We have found by numerous tests that from 375–500 molecular weight is a critical range. Below 375 oil solubility is lost and above 500 the acid number is too low and the zinc content of the salt is too low.

Having thus fully described the invention, what we claim as new and desire to secure by Letters Patent is:

A pesticidal composition comprising: a solution of a zinc salt of petroleum sulphonic acids which have a molecular weight within the range of 375–500 in mineral spirits.

ARTHUR MINICH.
MILTON NOWAK.

REFERENCES CITED

The following references are of record in the file of this patent:

UNITED STATES PATENTS

| Number | Name | Date |
|---|---|---|
| 1,873,582 | Hampton et al. | Aug. 23, 1932 |
| 2,021,137 | Stone | Nov. 19, 1935 |
| 2,173,453 | Mispley et al. | May 17, 1939 |
| 2,186,134 | Chapman | Jan. 9, 1940 |
| 2,362,464 | Britton et al. | Nov. 14, 1944 |
| 2,363,561 | Smith et al. | Nov. 28, 1944 |
| 2,365,057 | Coleman et al. | Dec. 12, 1944 |
| 2,382,976 | Coleman | Aug. 21, 1945 |
| 2,414,773 | Showalter | Jan. 21, 1947 |
| 2,483,800 | Zimmer et al. | Oct. 4, 1949 |

FOREIGN PATENTS

| Number | Country | Date |
|---|---|---|
| 147,608 | Great Britain | July 21, 1921 |

OTHER REFERENCES

Walker J. Econ. Ent. vol. 30, No. 6, 1937, pp. 962–967.